March 23, 1948.   L. B. WINTON   2,438,330
LIQUID LEVEL INDICATOR
Filed Oct. 14, 1942   2 Sheets-Sheet 2
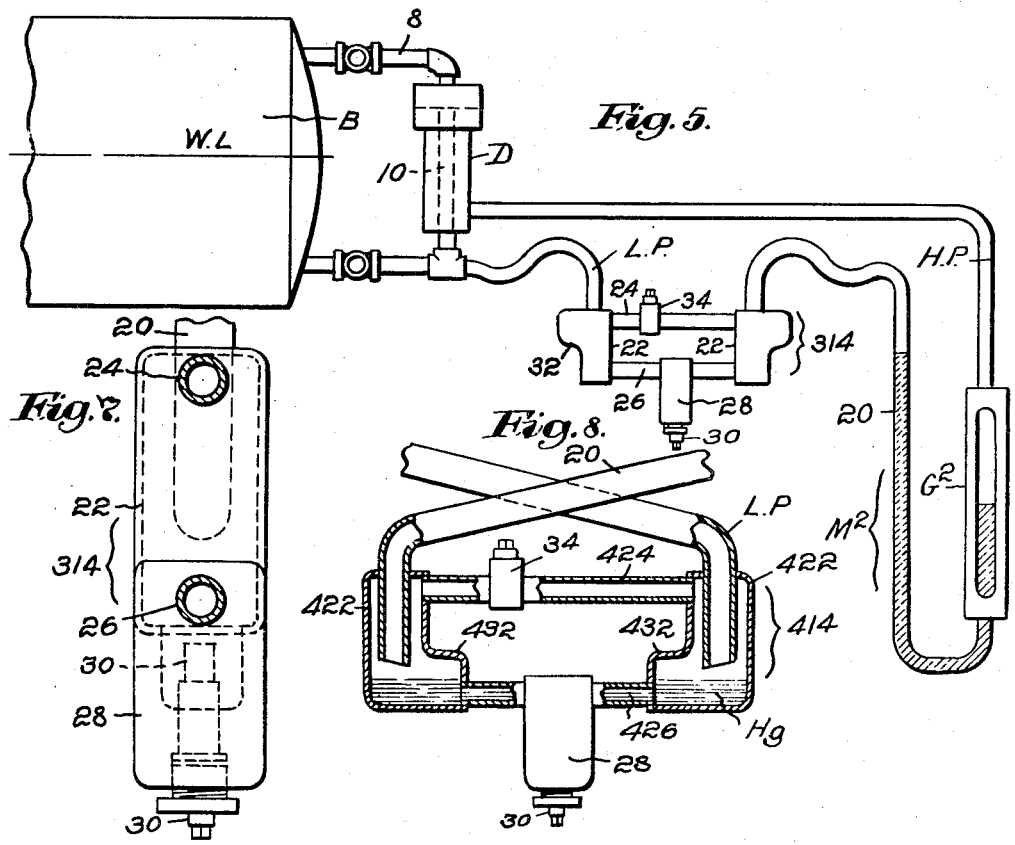
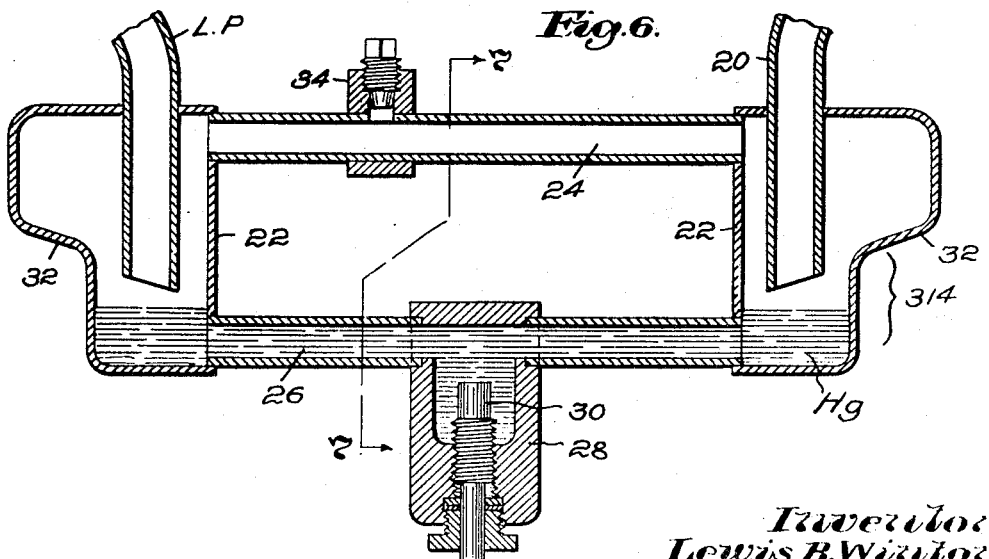
Inventor:
Lewis B. Winton, Patented Mar. 23, 1948

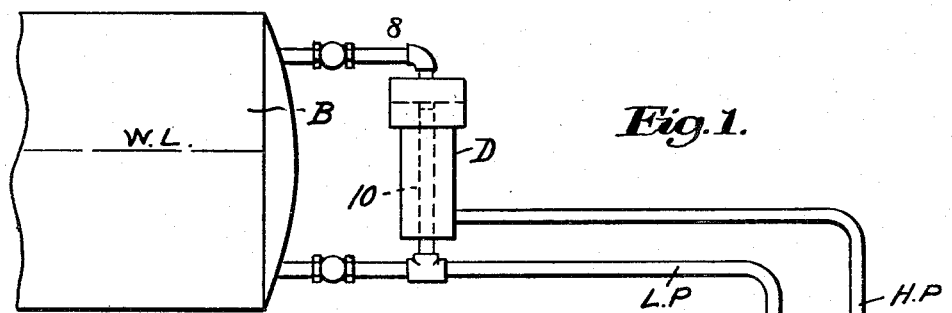
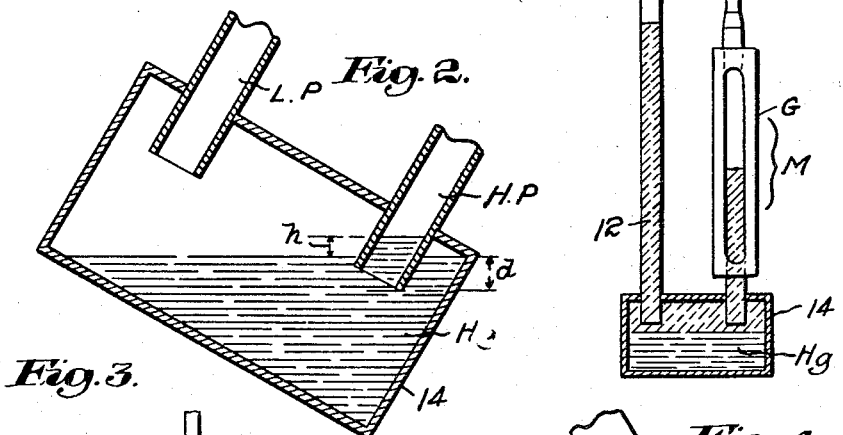
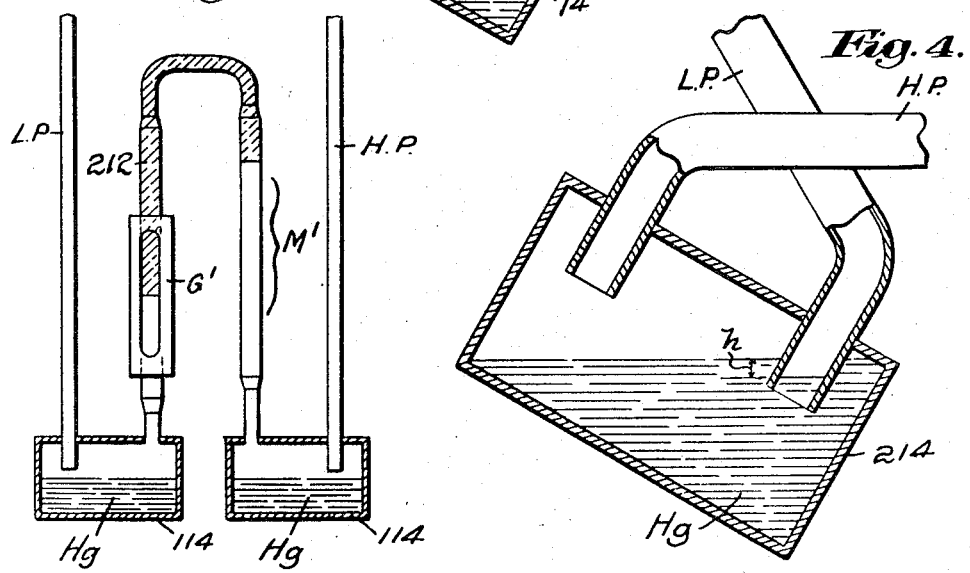

2,438,330

UNITED STATES PATENT OFFICE 2,438,330

LIQUID LEVEL INDICATOR

Lewis B. Winton, Greenwich, Conn., assignor, by mesne assignments, to Jerguson Gage & Valve Co., a corporation of Massachusetts Application October 14, 1942, Serial No. 461,944

14 Claims. (Cl. 73—299)

This invention relates to liquid level indicating devices and the object is to provide a mechanism for use with containers which are subject to bodily angular movement in use whereby excessive fluctuations of the indication will be avoided. Thus in the case of a marine boiler as the vessel rolls or pitches the water surges from one part of the boiler to another. Thus the water level, as exhibited, for example in an ordinary gage glass, fluctuates rapidly, and in fact the usual gage glass may become practically useless in a seaway. Similar action is observed in the case of other indicating instruments.

In accordance with my invention I utilize a body of very heavy liquid, such as mercury, so related to the system that movement of the mercury surface on a predetermined inclination of the system is taken advantage of to effect interruption or modification of the flow of liquid in the system and thus to control the indicating action. In particular in the examples herein shown the effect is to "cut into" the liquid-containing system a differential pressure device of the mercury U-tube type either to reduce the extent of indicating movement resultant from a given change of differential pressure due to inclination or to counteract such change and in a greater or less degree to compensate therefor.

My invention will be well understood from the following description of certain illustrative embodiments thereof shown by way of example in the accompanying drawings, wherein:

Fig. 1 is a diagrammatic illustration of one form of mechanism connected to a boiler drum;

Fig. 2 is an enlarged vertical section of a portion of the mechanism in Fig. 1;

Fig. 3 is a partial diagram showing another mechanism;

Fig. 4 is a view similar to Fig. 2 showing a modification;

Fig. 5 is a diagrammatic view similar to Fig. 1 showing a still different embodiment of the invention;

Fig. 6 is an enlarged vertical section through the chamber 314 which appears as a portion of Fig. 5;

Fig. 7 is a section on the line 7—7 of Fig. 6; and

Fig. 8 is a section similar to Fig. 6 showing a modified construction.

It will be understood that the views of the drawings are purely diagrammatic and that the proportion and spacing of the various parts are in no way realistic.

Referring now to Fig. 1 of the drawings, I there show diagrammatically the upper drum B of a marine boiler, the water level of which is indicated by a remotely located differential manometer M, herein shown as a hydrostatic manometer of the upright U-tube type having spaced legs containing a manometric fluid 12 heavier than water. This manometer is shown as connected to the boiler in accordance with the principles of the Tripp Patent 722,645, the left-hand leg of the U, viewing the drawing, being connected by the piping L. P. (indicating the expression "low pressure") to the water-containing spaces of the drum B while the right-hand leg is connected by the connection H. P. (indicating "high pressure") to a "datum chamber" D in which a fixed hydrostatic head of liquid is provided, the chamber being replenished by condensate supplied by the connection 8 to the steam-containing spaces of the boiler and having an overflow 10, herein leading to the water-containing spaces of the boiler, whereby there is provided a liquid column, the top of which is at the top of the overflow tube. One leg of the U-tube may have incorporated therein as a part thereof a gage glass G of the type having a metallic body and a flat glass or glasses, and herein the manometric fluid on the high pressure side of the system moves in the gage in the manner of a water column in an ordinary gage glass to indicate the liquid level in the boiler.

We may suppose for convenience in the discussion that the design of the parts is such that the surface of the liquid in the gage G moves, when the system is horizontal as shown, an amount approximately equal to the movement of the water line W. L. in the boiler drum B. The arrangement such as described may be located at any convenient position relative to the boiler as the heads in the connecting pipes L. P. and H. P. below the low pressure level of the boiler balance one another.

For purposes of simplicity in the description let us suppose that Fig. 1 represents a marine installation wherein the datum chamber D and the legs of the U-tube are in the central plane of the boiler in an athwartships plane. The effect of the pitching of the vessel on the indication is then not serious, but if the vessel rolls from side to side corresponding to a movement in the plane of the paper in the drawing, the water surges in the drum B. If we imagine the system as rotating clockwise, viewing the drawing, the surface of the water will remain horizontal and will intersect the center line of the boiler at a fixed point relative to the physical parts of the system. For instance, it will be at an unchanging distance below the top of the boiler drum measured along the center line. Since we are interested in a differential between the rigidly related boiler drum B and datum cup D, we may, without loss of generality, consider the movement as a rotation about this point, during which there subsists a fixed or constant hydrostatic head on the L. P. side. However, the datum chamber D will be lowered relatively to the center of the boiler, decreasing (proportionately to the sine of the angle of rotation) the differential of the pressures which maintains the surface of the manometric liquid in the right-hand end of the U-tube relatively depressed and tending to cause a rise in the indication of the gage glass. In other words, the low pressure relatively increases. As the vessel rolls in the other direction, the datum chamber is moved upwardly, the "high pressure" increases relatively and the indicating surface in the gage will move upward. Herein this action and the flow of liquid to or from the boiler to cause fluctuation at the monometer is controlled by the use of a body of mercury or like heavy fluid which is normally by-passed by the liquids in the system but which on inclination of the system to a certain amount is, as it were, cut into the line to function in the manner of a mercury U-tube and thus modify the response of the indicating means to the disturbance.

For this purpose, in the construction shown in Fig. 1, the two legs of the U-tube, which are in effect continuations of the H. P. and L. P. lines, depend into a relatively large chamber 14 which thus forms the base of the U. The bottom of the chamber receives a body of liquid Hg, preferably mercury as indicated by this legend, of a density several times that of the manometric liquid and much greater than that of the water which is the liquid the level of which is being measured. Above the surface of the mercury the chamber provides, when the system is plumb, a passageway permitting the free movement of manometric fluid from one leg of the U-tube to the other. In other words, in the horizontal position illustrated in Fig. 1 the operation is the same as if the surface of the mercury were actually the physical bottom of the chamber.

Assuming now that the system is rotated clockwise, as above indicated the low pressure tends relatively to increase. At a predetermined angle, depending on the design of the mechanism, the mercury will submerge the depending end of the H. P. tube (herein in Fig. 1 the right-hand leg of the manometer) and seal it off. The chamber and the high pressure tube in the position diagrammatically illustrated in Fig. 2 now in effect form a mercury U-tube and the relatively increased pressure on the L. P. side forces the mercury up the H. P. tube to provide a head $h$ counterbalancing the increased pressure. This movement of the mercury surface in the H. P. tube is, of course, transmitted to the gage G, but, broadly speaking, the movement of the mercury surface is in the ratio of about 1 to 12 and the fluctuating movement of the indicating surface is therefore so dampened or reduced that it remains in the neighborhood of the correct indication instead of racing to the top of the glass. On inclination of the system counterclockwise the mercury submerges the depending end of the L. P. leg and the action is similar in checking or dampening the descent of the indicating surface in the gage G.

In Fig. 3 I have shown a manometer M' of the inverted U-tube type containing a manometric liquid 212 lighter than water and having a gage G' on the low pressure side so that the water which supports the manometric liquid rises and falls in the gage as the water in the boiler rises and falls in much the same manner as the water rises in an ordinary gage glass attached to the boiler. The legs of the U-tube M' open to chambers 114 similar to the chamber 14 of Fig. 1 and the H. P. and L. P. connections from the datum chamber and boiler drum respectively depend into these chambers laterally of the U-tube legs. The bottoms of the chambers receive mercury as before and it is clear that if the system tilts clockwise the mercury in the right-hand chamber will submerge the depending end of the high pressure connection, and if it tilts counterclockwise the mercury in the left-hand chamber will submerge the depending end of the low pressure connection with results as before.

In Fig. 1 the mercury is disposed in that portion of the liquid-containing spaces of the system which contains the manometric liquid 12 whereas in Fig. 3 it is interposed in a water-containing space of the system remote from the manometric liquid. The device, as shown in Fig. 1, is double-acting, functioning on inclination in either direction, whereas in Fig. 2 the mechanism embodies two single-acting parts, one functioning on clockwise inclination and the other on counterclockwise inclination viewing the drawing. This indicates that the mechanism may be built into a system practically anywhere in the liquid-containing spaces thereof. For example, in Fig. 5, presently to be described, I will show a double-acting mechanism in the water line between the drum B and the manometer $M^2$. Also, referring to Fig. 3 as an example of my invention, the inverted U-tube manometer shown may be considered as an exemplification of any differential manometer subject to variable and constant hydrostatic heads, the difference between which is proportional to the liquid level in the boiler. On the other hand, we might consider the gage G' as the equivalent of an ordinary gage glass in which the lower end is connected with the water-containing spaces of the boiler and showing a column of boiler liquid indicative of the level. Herein because of the position of this glass a compensating hydrostatic head from the datum chamber has been introduced. We might consider an ordinary gage glass in which the upper end is connected to the steam-containing spaces of the boiler above the high water mark as a special case wherein such compensating head has a zero value.

Referring now to Fig. 4, I have there shown a mercury-containing chamber 214 similar to the chamber 14 in Fig. 2 but differently connected to the system in that the L. P. tube wherein the pressure tends relatively to rise as the system is inclined downwardly and to the right in the drawing depends into the right-hand portion of the chamber while the H. P. tube depends into the left-hand portion of the chamber. In other words, the connections are reversed. When the system is inclined, as shown in Fig. 4, the low pressure side, in which the pressure relatively tends to increase, will be sealed off. A mercury U-tube is formed as before, but the increase of pressure on the L. P. side now tends to raise the surface of the mercury outside of the submerged end of the tube and balancing head $h$ is provided which directly counteracts the increased pressure in the L. P. connection and tends to cancel out the fluctuation which would otherwise take place in the indicating gage, and by proper design of the mechanism we can have the mercury pressure exactly balance the increase in liquid pressure in L. P. to prevent surging after the end of the conduit has been sealed off, or the mercury pressure may build up on inclination a little more rapidly than the liquid pressure to provide an adequate seal but not to permit any important change of gage reading. In contrasting the constructions of Fig. 2 and Fig. 4, in Fig. 2 the mercury acts as a valve which, however, yields and permits some gage travel. In a sense the measurement of the differential pressure is then taken charge of by a mercury manometer and it is, speaking generally, the amount of movement of the mercury surface which is indicated in the gage. In the construction of Fig. 4 an opposing pressure is developed which, if desired, may be made equal and opposite to the change of pressure in the system due to the inclination.

The surging of the indicating surface in the manometer will depend in part on the spacing of the datum chamber D from the center of the boiler as well as the spacing of the legs of the U-tube and in constructions like Figs. 3 and 5 the spacing of the conduit ends which depend into the mercury-containing chamber or chambers. I incorporate herein by reference my copending application, now Patent 2,334,463, dated Nov. 16, 1943, wherein I have discussed fully this factor of spacing. The relative areas of those parts of the system in which the meeting surfaces of dissimilar liquids move while the system is in operation are also a factor to be taken into account.

As one application of the latter factor and referring to Fig. 2, it will be seen that the actual movement of the mercury into the H. P. tube is for a distance $h+d$. The head $h$ creates the effective differential pressure. There is, however, a volumetric displacement of the liquid in the tube measured by $h+d$ and a corresponding volumetric displacement at the gage. Thus if the cross-sectional area at the gage were very small and the pipe H. P. very large, this volumetric displacement would be multiplied as an upward displacement of the indicating surface of the gage.

In Fig. 5 I have illustrated a construction wherein among other things the effect of such volumetric displacement is minimized. I have there shown a "chamber" 314 corresponding broadly in purpose and function to the chambers 14 and 114 of the other modifications. The device is of the double-acting type corresponding in a sense to 14 and is interposed between the boiler B and the manometer $M^2$ with its gage $G^2$, the connection herein shown being of the type shown in Fig. 2 with the end of the L. P. line in which the pressure tends relatively to increase on clockwise rotation of the system depending into the left-hand portion of the chamber, and the connection 20 from the left-hand leg of the erect U-tube manometer, which connection 20, as far as the action of the chamber goes, may be considered a high pressure connection depending into the right-hand portion of the chamber which is depressed on such rotation. The so-called chamber 314, as best seen in Figs. 6 and 7, embodies two wells 22 of relatively great cross section into which the ends of the conduits L. P. and 20 depend. A connection 24 between the upper portions of the wells provides for the free transfer of water between them when flow can take place through both branches of the conduit, that is, when the system is plumb. The lower portions of the wells are connected by a pipe 26 of relatively small cross section. The bottoms of the wells and the lower cross-connection 26 receive mercury Hg to form a mercury U-tube which, when the parts are plumb, is by-passed by the connection 24, water flowing, for instance, from L. P. through 24 and out through 20, that is, the surface of the mercury being normally somewhat below the depending ends of the conduits L. P. and 20. I have herein shown the connection 26 as including an enlargement 28 in which is a displacement screw 30 operable from the exterior providing for the adjustment of the mercury level in the two wells. In Fig. 6 also a filling plug 34 is shown in the connection 24.

Now, let us suppose the chamber shown in Fig. 6 to tilt clockwise. The right-hand well will be fed from the left-hand well of equal cross-sectional area and the mercury rises rapidly and seals the bottom of the tube 20. Now, however, the left-hand well will have been drained or substantially so and further rise in the right-hand well will be at the expense of the column in the relatively small connecting tube 26. For a maximum inclination of the system, therefore, the rise of mercury within the depending conduit end will be slight and what we may call the idle volume-displacing head, $d$ in Fig. 2, is minimized in amount.

For the same purpose I have herein shown each of the wells 22 as provided with lateral enlargements 32 so that when a conduit end is submerged the section of the chamber then being fed with mercury is still further increased and the rise of mercury within the tube end still further restricted. That is, when the mercury begins to flow over the edge of the lower smaller portion of the well into the enlargement, the rise for a given transfer of volume is very small.

Provision may be made for adjusting the normal or zero angle of the mechanism. Thus in Fig. 5 we may consider that the connections to the chamber 314 are made with small copper tubing, in which case the angular position of the chamber 314 may be adjusted by bending the tubing somewhat, this possibility being indicated in the drawing by showing the piping at either side of the chamber as more or less convoluted. The angular adjustment is of particular advantage for marine use in case the ship due to conditions of loading or other conditions is trimmed other than on an even keel. The adjustment permits the positioning of the mechanism so that the angular operation when the mercury seals a depending conduit end will be the desired angle to a true horizontal.

Referring now to Fig. 8, I have there shown a chamber 414 similar in some ways to the chamber 314 of Fig. 6 but modified in design to provide for a connection on the principles exemplified by Fig. 4. In other words, the L. P. connection wherein the pressure tends relatively to rise on clockwise rotation of the system opens to the right-hand well 422 which is depressed on such rotation and the connection 20 to the left-hand well. The wells 422 are connected at their outer ends by a connection 424 similar to the connection 24 and providing for a flow of water when the system is plumb. Here, however, the lower portions of the wells have enlargements 432 at about the level of the lower ends of the conduits L. P. and 20 and they are connected by a pipe 426, the small size of which is significant only in that it economizes mercury. In other words, we may consider the wells 422 as having enlargements in their lower portions or we may consider the upper portions as reduced extensions from the legs of a mercury U-tube of relatively great cross-sectional area. Assuming the construction to be rotated clockwise, the end of the low pressure connection is first sealed. Thereafter the upper portion of the right-hand well 422 of relatively small cross-sectional area is fed with mercury from the lower portion 432 of the left-hand well of larger cross-sectional area and the mercury rises rapidly around the end of the tube permitting the building up of a counteracting head $h$ (see Fig. 4) to a substantial amount without breaking the seal.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A liquid level indicating mechanism for systems subject to bodily displacement comprising a gage of the U-tube type having spaced legs having means for connecting them to different sources of pressure, a manometric liquid in the tube, the connecting portion of the U receiving in its bottom a relatively heavy liquid above the surface of which there is a passage between the legs for the manometric liquid when the gage is vertical but which enters one of the legs if the gage is inclined to a determined angle in the plane of the legs.

2. A liquid level indicating mechanism for systems subject to bodily displacement comprising a differential manometer, means for placing one side of the same in communication with the body of liquid being measured, means for placing the other side of the same in communication with a source of fixed hydrostatic pressure, one of said means including in a liquid-receiving part thereof a structure of the U-tube type, the connecting portion of which receives in its bottom a body of heavy liquid defining, when the structure is vertical, above its surface a connecting passage between the legs of the U but which enters one of the legs if the system is inclined to a determined angle in the plane of the legs.

3. A liquid level indicating mechanism for systems subject to bodily displacement comprising a gage of the U-tube type having spaced legs having means for connecting them to different sources of pressure, a manometric liquid in the tube, the connecting portion of the U receiving in its bottom a relatively heavy liquid above the surface of which there is a passage between the legs for the manometric liquid when the gage is vertical but which enters one of the legs if the gage is inclined to a determined angle in the plane of the legs, said U-tube structure being mounted to permit its angular adjustment in said plane.

4. Mechanism for indicating the liquid level in a container subject to bodily displacement comprising a conduit communicating at one end with the liquid-containing space of the container to receive a liquid column of variable head therefrom and receiving at the other end a liquid column of constant head, there being a body of different liquid interposed between said columns of liquid in the conduit to indicate by its position the liquid level, the space receiving one of the liquids including a chamber depending below the conduit, the upper portion of which provides when the structure is plumb a passageway for the liquid along the conduit, the bottom of the chamber receiving a relatively heavy liquid which when the system which comprises the mechanism and container with which it is associated is inclined to a determined angle rises at one side of the chamber to close off said passageway.

5. A liquid level indicating mechanism for systems subject to bodily displacement comprising a differential manometer, a connection for placing one side of the same in communication with the body of liquid being measured, a connection for placing the other side of the same in communication with a source of fixed hydrostatic pressure, and valve means for interrupting one of said connections when the system is inclined to a determined angle including a chamber interposed in a liquid-containing portion of the system providing in the upper portion thereof a direct passageway and having in the bottom thereof a body of heavy liquid operating when the system is inclined and the level of the liquid rises at one side of the chamber to close off said passageway.

6. A liquid level indicating mechanism for systems subject to bodily displacement comprising a differential manometer, a conduit for placing one side thereof in communication with the body of liquid the level of which is to be measured, a conduit for placing the other side thereof in communication with a source of fixed pressure, at least one of said conduits having a chamber interposed therein, the connections of the conduit to the chamber comprising on at least one side thereof a conduit end depending into the chamber, the chamber receiving in its bottom a body of heavy liquid above the surface of which there is maintained, when the structure is vertical, a connecting passageway between the branches of the conduit, the liquid, when the system is inclined to a predetermined angle, entering said depending end.

7. A liquid level indicating mechanism for systems subject to bodily displacement comprising a differential manometer, a conduit for placing one side thereof in communication with the body of liquid the level of which is to be measured, a conduit for placing the other side thereof in communication with a source of fixed pressure, at least one of said conduits having a chamber interposed therein, the connections of the conduit to the chamber comprising on at least one side thereof a conduit end depending into the chamber, the chamber receiving in its bottom a body of heavy liquid above the surface of which there is maintained, when the structure is vertical, a connecting passageway between the branches of the conduit, the heavy liquid, when the system is inclined to a predetermined angle, entering said depending end, the relation of the parts being such that the portion of the conduit into which the heavy liquid thus enters is one wherein the pressure tends relatively to increase consequently on such inclination.

8. A liquid level indicating mechanism for systems subject to bodily displacement comprising a differential manometer, a conduit for placing one side thereof in communication with the body of liquid the level of which is to be measured, a conduit for placing the other side thereof in communication with a source of fixed pressure, at least one of said conduits having a chamber interposed therein, the chamber comprising a well into which an end of one branch of the conduit enters, the well forming the upper portion of one leg of a U, a portion of which is of markedly different sectional area from the well, the U leading to the other branch of the conduit and a connection from the upper portion of the well to said other branch and providing a passageway for liquid when the system is plumb, a body of heavy liquid in the U having its surface normally below the conduit end but adapted on inclination of the system to rise in the well first to seal the conduit end and then rise above said end with volumetric transfer of liquid into said well from said portion of different sectional area.

9. A liquid level indicating mechanism for systems subject to bodily displacement comprising a differential manometer, a conduit for placing one side thereof in communication with the body of liquid the level of which is to be measured, a conduit for placing the other side thereof in communication with a source of fixed pressure, at least one of said conduits having a chamber interposed therein, said chamber comprising a pair of wells of relatively large cross-sectional area into which the end portions of the conduit depend, a connection between the upper portions of said wells and a connection of relatively small cross-sectional area between the lower ends of the wells, and a body of heavy liquid in the bottom of the chamber, the surface of which is below the conduit ends when the system is vertical but which flows from the lower connection into one of the wells to rise therein to submerge the depending conduit end in said well when the system is inclined to a predetermined angle.

10. A liquid level indicating mechanism for systems subject to bodily displacement comprising a differential manometer, a conduit for placing one side thereof in communication with the body of liquid the level of which is to be measured, a conduit for placing the other side thereof in communication with a source of fixed pressure, at least one of said conduits having a chamber interposed therein, said chamber comprising a pair of wells of relatively large cross-sectional area into which the end portions of the conduit depend, the upper portions of the wells being enlarged laterally at about the elevation of the conduit ends, a connection between the upper portions of said wells and a connection of relatively small cross-sectional area between the lower ends of the wells, and a body of heavy liquid in the bottom of the chamber, the surface of which is below the conduit ends when the system is vertical but which flows from the lower connection into one of the wells to rise therein to submerge the depending conduit end in said well when the system is inclined to a predetermined angle.

11. Mechanism for indicating the liquid level in a container subject to bodily displacement comprising a conduit communicating at one end with the liquid-containing space of the container to receive a liquid column of variable head therefrom and receiving at the other end a liquid column of constant head, there being a body of different liquid interposed between said columns of liquid in the conduit to indicate by its position the liquid level, the space receiving one of the liquids including a chamber comprising a pair of wells, the adjacent portions of the conduit at opposite sides of the chamber presenting ends depending into the upper portion of the same at the locations of the wells, there being a connection between the upper portions of said wells normally to permit the flow of liquid therethrough when the system which comprises the mechanism and the container with which it is associated is vertical, and a connection between the lower portions of said wells including a region of a cross-sectional area markedly different from that of said wells, a body of heavy liquid in said latter connection, the surface of which is below the conduit ends when the system is vertical but which rises to seal one of them when that side of the chamber is tilted downwardly and then rises above said end with volumetric transfer of liquid into the well from said region of different cross-sectional area.

12. A liquid level indicating mechanism for systems subject to bodily displacement comprising a differential manometer, a conduit for placing one side thereof in communication with the body of liquid the level of which is to be measured, a conduit for placing the other side thereof in communication with a source of fixed pressure, at least one of said conduits having a chamber interposed therein comprising a pair of wells having enlarged upper ends into which the conduit ends depend, a connection between the upper ends of the wells and a connection between the lower ends of the wells, the bottoms of the wells and said lower connection receiving a body of heavy liquid, the surface of which lies below said conduit ends when the system is plumb but which rises to seal one of them when the system is inclined to depress that end and then rises in the well about the same, the conduit end associated with such well being that in which the pressure tends relatively to decrease because of inclination of the system in a direction to depress the corresponding well.

13. A liquid level indicating mechanism for systems subject to bodily displacement comprising a differential manometer, a conduit for placing one side thereof in communication with the body of liquid the level of which is to be measured, a conduit for placing the other side thereof in communication with a source of fixed pressure, at least one of said conduits having a chamber interposed therein comprising a pair of wells having reduced upper ends into which the conduit ends depend, a connection between the upper ends of the wells and a connection between the lower ends of the wells, the bottoms of the wells and said lower connection receiving a body of heavy liquid, the surface of which lies below said conduit ends when the system is plumb but which rises to seal one of them when the system is inclined to depress that end and then rises in the well about the same, the conduit end associated with such well being that in which the pressure tends relatively to increase because of inclination of the system in a direction to depress the corresponding well.

14. Mechanism for indicating the liquid level in a container subject to bodily displacement comprising a conduit communicating at one end with the liquid-containing space of the container to receive a liquid column of variable head therefrom and receiving at the other end a liquid column of constant head, there being a body of different liquid interposed between said columns of liquid in the conduit to indicate by its position the liquid level, the space receiving one of the liquids including a chamber, the adjacent portions of the conduit at opposite sides of the chamber presenting ends depending into the upper portion of the chamber, a body of heavy liquid in the lower portion of the chamber, the flow of liquid through the upper portion of the chamber from conduit end to conduit end above the level of the heavy liquid being permitted when the mechanism and the container with which it is associated are vertical, the lower portion of the chamber including a region of markedly different cross-sectional area from the cross-sectional area of the upper portion about the conduit ends, whereby the surface of the heavy liquid which is below the conduit ends when the mechanism is vertical rises to seal one of them when that side of the chamber is tilted downwardly and then rises above said end with volumetric transfer of the heavy liquid between regions of different cross-sectional area.

LEWIS B. WINTON.

REFERENCES CITED

The following references are of record in the file of this patent:

UNITED STATES PATENTS

| Number | Name | Date |
|---|---|---|
| 1,086,561 | Ritz-Voller | Feb. 10, 1914 |
| 1,382,532 | Newton | June 21, 1921 |
| 1,394,031 | Lundin | Oct. 18, 1921 |
| 2,133,215 | Sneed | Oct. 11, 1938 |
| 2,286,919 | McNeill | June 16, 1942 |